United States Patent [19]

McCall

[11] Patent Number: 4,638,672
[45] Date of Patent: Jan. 27, 1987

[54] FLUID FLOWMETER

[75] Inventor: Floyd McCall, Hemet, Calif.

[73] Assignee: Ametek, Inc., New York, N.Y.

[21] Appl. No.: 649,512

[22] Filed: Sep. 11, 1984

[51] Int. Cl.⁴ .............................................. G01F 1/40
[52] U.S. Cl. .................................................. 73/861.52
[58] Field of Search .......... 73/861.52, 861.22, 861.24, 73/861.63, 861.64, 861.61, 202; 138/44

[56] References Cited

U.S. PATENT DOCUMENTS

| 1,126,275 | 1/1915 | Rice | 73/861.64 |
| 2,942,465 | 6/1960 | Carbone | 138/44 |
| 3,196,680 | 7/1965 | Curran | 73/861.52 |
| 4,008,611 | 2/1977 | Turocy | 73/861.52 |
| 4,237,739 | 12/1980 | Owen et al. | 73/861.63 |
| 4,350,047 | 9/1982 | Dewey, Jr. et al. | 73/861.22 |

Primary Examiner—Donald O. Woodiel
Attorney, Agent, or Firm—Bruno J. Verbeck

[57] ABSTRACT

A fluid flowmeter is disclosed herein which includes a fluid displacement member positioned in the fluid flow to substantially linearize the velocity profile associated therewith. In one form of the invention the pressure differential in the fluid existing across the fluid displacement member is advantageously exploited, and several embodiments thereof are disclosed. In another form of the invention the fluid displacement member is utilized to produce trailing vortices.

11 Claims, 5 Drawing Figures

FLUID FLOWMETER

DESCRIPTION

1. Technical Field

The present invention relates in general to flowmeters, and in particular to flowmeters of the fluid displacement type.

2. Background Art

A particularly troublesome problem associated with flowmeter design and implementation derives from the inherent non-linearity of the velocity profile of fluid as it courses through a section of pipe. Thus, the interaction between the fluid and the pipe wall results in a curved velocity profile wherein the fluid velocity in the vicinity of the pipe center is greater than the fluid velocity adjacent the pipe wall. Compounding this problem is the fact that altering the fluid flow rate results in a non-linear alteration of the velocity profile.

For virtually any flow condition the non-linearity of the velocity profile can be converted into a mean velocity of the fluid and an associated mean cross-sectional area. This does not, however, overcome the problem of non-linearity since changes in fluid flow conditions result in non-linear changes to the mean velocity and its associated cross-sectional area.

Hitherto, the aforementioned non-linear characteristics of the fluid velocity profile have been accepted as an uncontrolled variable in flowmeter design with the knowledge that such non-linearity would necessarily detract from the range of flow rate conditions over which the flowmeter could operate within acceptable error limits. This range is referred to as a flowmeter's linear rangeability and, until the present invention, has been generally quite limited. For example, flowmeters employing conventional orifice plates typically exhibit a linear rangeability in the order of only about 3:1.

The problem of non-linearity also manifests itself with another type of flowmeter known as a vortexmeter. Very briefly, it is well known that an object placed in a moving fluid sheds vortices from the edges thereof, and that the rate of vortex production is in part a function of the fluid velocity about the object. Exemplary embodiments of such vortex flowmeters can be found in U.S. Pat. Nos. 4,404,858 and 4,416,159. These vortexmeters, like the orifice plate, are also quite limited in their linear rangeability because of the non-linearity of the fluid velocity profile, as previously discussed.

In view of the foregoing drawbacks existing in the prior art, it would be highly desirable and beneficial to provide a flowmeter with some mechanism for reducing the non-linearity of the fluid velocity profile. In this regard, the ability to reduce such non-linearity would result in a flowmeter having increased linear rangeability. To the extent that the non-linearity can be reduced over a relatively large range of flow conditions, then in that event such a flowmeter would have a linear rangeability rendering it particularly useful for measuring flow under widely varying flow conditions and in widely varying industrial applications.

DISCLOSURE OF THE INVENTION

In view of the foregoing, an object of the present invention is to provide a flowmeter which incorporates means for reducing the non-linearity associated with the fluid velocity profile.

Another object of the present invention is to provide such a flowmeter wherein such non-linearity is reduced over a relatively large range of fluid flow conditions, thereby increasing the linear rangeability of such a flowmeter.

Yet another object of the present invention is to provide such a flowmeter with the capability of being used in a fluid environment wherein solids and other contaminants are present.

A still further object of the present invention is to provide such a flowmeter which is of simplified construction, which is adapted for manufacture at a relatively low cost, and which possesses all of the aforementioned desirable features.

Briefly, the foregoing and other additional objects of the present invention are realized by a fluid displacement member which is positioned substantially centrally within a pipe or conduit having fluid communicating therethrough. The fluid displacement member, which takes the general form of a disc, is mounted substantially normal to the direction of fluid flow and is of a diameter smaller than the inner diameter of the pipe such that the fluid is displaced and caused to flow through the region defined by the periphery of the fluid displacement member and the inner surface of the conduit proximate such periphery.

The inventor herein has discovered that a flowmeter with increased linear rangeability can be produced by the placement of a substantially flat disc in a position as above-described. The disc operates to reduce the non-linearity of the fluid velocity profile in the aforementioned region over a determinable range of flow rate conditions such that the pressure differential across the region can be taken as a relatively accurate indicator of fluid velocity through the region. With the fluid velocity profile tending towards linearization, and with the area of the region being fixed, it then becomes clear that a greater linear correspondence is achieved through the region in terms of changes in both fluid velocity and fluid flow rate. This linearization of the fluid flow has equal import with respect to measuring flow using vortexmeters of the type previously discussed.

While the use of merely a flat disc as the fluid displacement member results in a flowmeter of enhanced linear rangeability, even greater linear rangeability can be realized by providing the disc on the upstream side thereof with a sloped wall extending outwardly from the disc. Empirical and theoretical studies have revealed that such a sloped wall interacts with the fluid in such a manner that a very high degree of linearity in the fluid velocity profile is achieved as the fluid passes through the region between the disc periphery and the inner surface of the pipe or conduit, and that this very high degree of linearity holds true for an unusually and unexpectedly large range of fluid flow rates, thus resulting in a flowmeter having an unusually and unexpectedly large linear rangeability.

The extent to which the sloped wall extends upstream from the disc, i.e.—its slope, is limited primarily by practical considerations. Generally speaking, the greater the extension, then the greater the linearization of the velocity profile in the aforementioned region. A drawback associated with a large extension is, however, that the pressure differential across the region is correspondingly reduced and consequently becomes more difficult to measure with a high degree of confidence as to its accuracy. Thus, the ability of available equipment to measure pressure represents a practical limitation, with the ultimate objective being to maximize the linearity of the fluid velocity profile in the region while maintaining a sufficiently large pressure differential across the region to ensure accurate measurement.

While not critical of the invention, the fluid displacement member may also include a sloped wall extending outwardly from the downstream side thereof for minimizing the line pressure drop across the fluid displacement member and for optimizing the return velocity of the fluid as it once again reassumes free stream conditions in the pipe or conduit.

By virtue of its ability to effect substantial linearization of the fluid velocity profile, the fluid displacement member above-described may be incorporated into any one of a plurality of flowmeter systems. In one such system conduit means are provided for diverting a portion of the fluid communicating through the pipe or conduit along an auxiliary or secondary flowpath having one end positioned upstream of the fluid displacement member and its opposite end positioned just downstream of the aforementioned region. The pressure differential across the region manifests itself as a pressure differential between the two ends of the auxiliary flowpath. The dimensions of the auxiliary flowpath are selected such that a constant of proportionality exists between the fluid diverted along the auxiliary flowpath and the remainder of the fluid flowing through the conduit or pipe, and this relationship holds true throughout the entire linear range of the flowmeter system. Totalizer means, which may take the form of a relatively small turbine, are disposed in the auxiliary flowpath for measuring the total volume of fluid passing therethrough, and this measurement is multiplied by a predetermined constant of proportionality to determine the total volume of fluid flowing through the pipe or conduit.

In a variant form of the above flow meter system, the totalizer means is replaced by a rate-of-flow means, which may take the form of a conventional rotometer, for measuring the rate of fluid flow through the auxiliary flowpath. This measurement may likewise be multiplied by a predetermined constant of proportionality to yield fluid flow rate through the pipe or conduit.

Yet another variant form of the foregoing flowmeter systems includes positioning a pressure transducer across the auxiliary flowpath. In this flowmeter system fluid would not flow along the auxiliary flowpath; however, a pressure differential would be established across the pressure transducer by virtue of the different pressures existing at each end of the auxiliary flowpath. This pressure differential, coupled with knowledge that the non-linearity of the fluid velocity profile through the region has been reduced, enables one to determine with a high degree of confidence as to its accuracy either total volume, rate of flow, or both.

In yet another embodiment of the present invention, a flowmeter system is provided wherein a plurality of pressure transducers are positioned downstream of the region in order to sense pressure fluctuations in the fluid resulting from the vortices shed from the periphery of the fluid displacement member. These pressure transducers are coupled to a processor which converts the frequency of the pressure fluctuations into either total volume, rate of flow, or both.

BRIEF DESCRIPTION OF THE DRAWINGS

The above-mentioned and other objects and features of this invention and the manner of attaining them will become apparent, and the invention itself will be best understood, by reference to the following description of the invention taken in conjunction with the accompanying drawings, wherein.

BEST MODE FOR CARRYING OUT THE INVENTION

Figure 1:
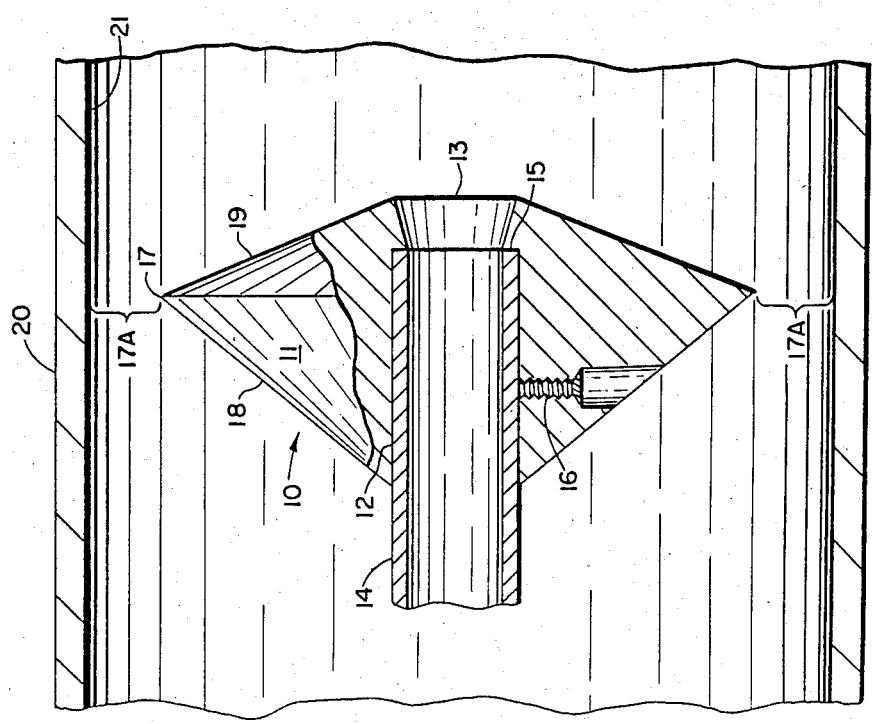
FIG. 1 is a partial, cross-sectional view of the preferred embodiment of a fluid displacement member constructed in accordance with the disclosure herein and as mounted in a section of conduit or pipe through which fluid is communicating from left to right.

Referring now to the drawings, and in particular to FIG. 1, therein is shown the preferred embodiment of a fluid displacement member 10 constructed in accordance with the preferred practice of the present invention. Stated in greater detail, fluid displacement member 10 comprises a substantially circular disc 11 having a bore 12 extending transversely therethrough and defining an aperture 13 on the rear or downstream side thereof. Bore 12 is dimensioned to receive the distal end portion of a hollow support arm 14, with the inward extension of support arm 14 being limited by an integral shoulder 15. Removable fastening means, such as the illustrated set screw 16, are provided for securing disc 11 to support arm 14.

Disc 11 is mounted on support arm 14 in substantially coaxial alignment with the longitudinal axis of a section of pipe 20 and is positioned therein such that the plane defined by the edge or periphery 17 of disc 11 is oriented substantially perpendicular to the direction of fluid flow through pipe 20. Defined between periphery 17 and the inner surface 21 of pipe 20 is a substantially annular space or region 17A of fixed cross-sectional area through which fluid coursing along pipe 20 must flow in order to pass around the obstruction formed by disc 11.

Means for linearizing the velocity profile of the fluid, i.e.—reducing the non-linearity associated therewith, as it passes through the aforementioned region are included by providing disc 11 with a sloped wall portion 18 extending outwardly from the plane of periphery 17 on the side thereof facing upstream. A sloped wall portion 19 is also provided on the opposite side of the plane, the outward extension of sloped wall portion 19 preferably being less than that of sloped wall portion 18.

Figure 2:
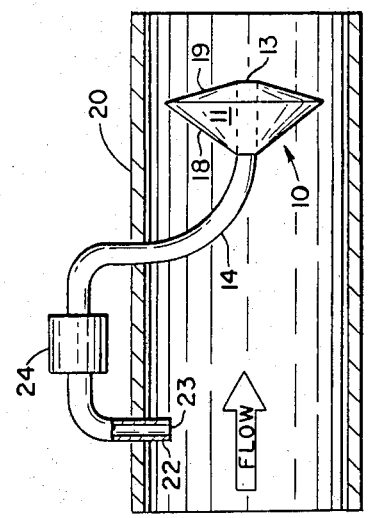
FIG. 2 is a partial, cross-sectional view of a differential pressure-type flowmeter system employing the fluid displacement member shown in FIG. 1.

The above-described fluid displacement member may be employed to produce a plurality of flowmeter systems, and the form of several such systems will be more fully understood by now referring to FIG. 2. More particularly, FIG. 2 illustrates a flowmeter system having hollow support arm 14 in fluid communication with a conduit 22 extending through pipe 20 a distance sufficient to position its inlet 23 in the fluid flow at a location upstream of fluid displacement member 10. In this manner an auxiliary fluid flowpath is defined between inlet 23 and aperture 13 on the rear of disc 11. By virtue of the pressure differential existing between inlet 23 and aperture 13, a plurality of conventional flow measurement devices can be positioned in the auxiliary flowpath to measure fluid flow through pipe 20. These devices are illustrated in schematic form and generally referred to by reference numeral 24.

One flowmeter system of the type shown in FIG. 2 comprises a by-pass flowmeter wherein reference numeral 24 signifies a small turbine mounted in the auxiliary flowpath for measuring the total volume of fluid communicating along the auxiliary flowpath from inlet 23 to aperture 13. Fluid through the auxiliary flowpath bears a fixed relationship to the fluid through pipe 20 and, therefore, one is thus able to determine total fluid flow through the by-pass flowmeter system.

A variant form of the above-described flowmeter system substitutes a conventional rotometer for the turbine to thereby yield the rate of fluid flow through pipe 20.

In yet another variant form a differential pressure transducer is mounted across the auxiliary flowpath to directly sense and measure the pressure differential between inlet 23 and aperture 13. The output from the pressure transducer is connected to a microprocessor (not shown) for determining either total flow, flow rate, or both.

Figure 3:
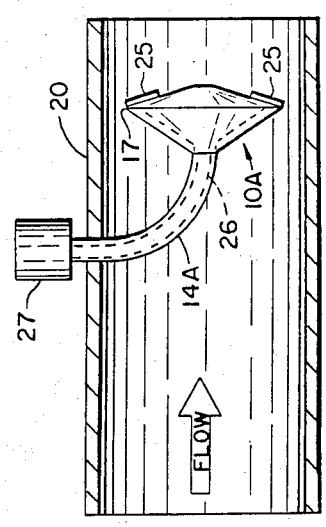
FIG. 3 is a partial, cross-sectional view of a vortexmeter system employing a fluid displacement member similar to that shown in FIG. 1.

FIG. 3 illustrates yet another practical application of the present invention as adapted to produce a vortexmeter. More particularly, a fluid displacement member 10A, which is substantially identical to the fluid displacement member 10 of FIGS. 1 and 2 except that it is preferably a solid body not having an aperture on the rear thereof, is substantially coaxially supported within a section of pipe 20 by a support arm 14A. A plurality of pressure sensors 25 are mounted on the downstream side of fluid displacement member 10A at a position enabling them to sense pressure fluctuations in the fluid resulting from vortices shed from the periphery 17. Pressure sensors 25 are connected via electrical leads 26 to a processor 27 which measures the frequency of the pressure fluctuations and converts that frequency into either total fluid flow, fluid flow rate, or both.

While the precise mechanism by which the present invention interacts with the fluid flow through a pipe to reduce the non-linearity associated with the fluid velocity profile is not altogether completely understood, it is believed that the fluid displacement member creates a turbulent zone in the pipe extending upstream from the disc which expands and contracts in response to changing flow conditions. As a consequence, a flowmeter embodying the present invention exhibits an unusually and unexpectedly large linear rangeability.

Figure 5:
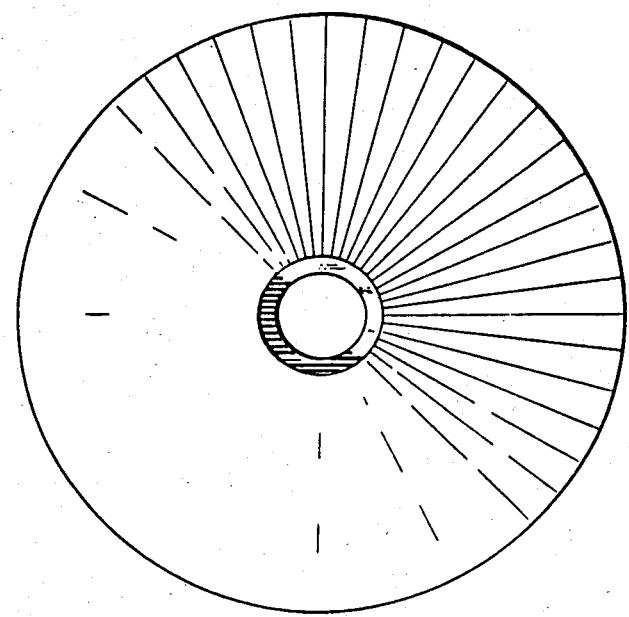
FIG. 5 is a front view of the fluid displacement member shown in FIG. 4 as taken in the direction of line 5—5.
Figure 4:
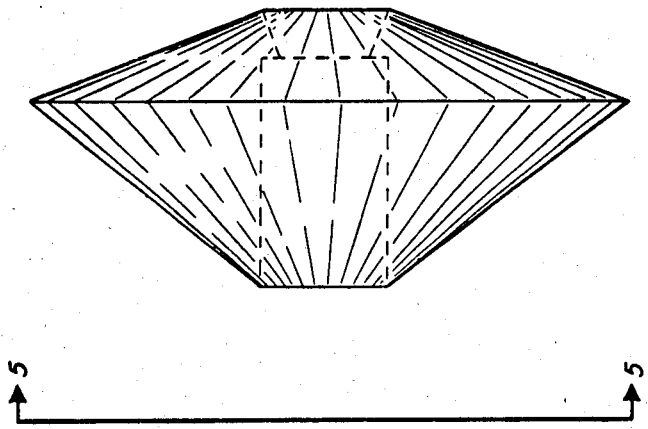
FIG. 4 is a side view of a specific embodiment of the fluid displacement member shown in FIG. 1.

An even greater understanding of this invention can be obtained by now referring to FIGS. 4 and 5 which illustrate a specific embodiment that was constructed and subjected to empirical studies in order to ascertain its linear rangeability within a given section of pipe. All dimensions shown in the figures, except for angles, are in inches. Thus, in FIGS. 4 and 5, the disc diameter is 6.279 inches, and the diameter of the bore extending therethrough is 1.330 inches.

A test rig was constructed by mounting the disc shown in FIGS. 4 and 5 within an elongated section of pipe having a nominal inner diameter of 10.156 inches. A plurality of taps were spaced axially along the pipe to permit a pressure probe to be inserted into the fluid flow for pressure measurements at various positions upstream, about, and downstream from the disc. With water flowing through the pipe, pressure measurements were taken at each of the taps for different flow rate conditions, and those measurements were then correlated to develop pressure profiles along the length of the pipe for each flow condition. A study of those pressure profiles revealed that the point at which the free stream pressure of the fluid began to drop was a function of the flow rate, and as the flow rate increased that point shifted further upstream from the disc.

The pressure measurements also yielded pressure drop across the disc for each flow rate condition, and a graph was prepared plotting pressure drop on one axis and the square of the fluid flow rate on the other axis. The plotted data produced a line of substantially constant slope and demonstrated that the test rig had an unusually and unexpectedly large linear rangeability within the range of about 500 to 4,500 gallons per minute of water.

In view of the foregoing it will be understood that disclosed herein is an invention, useful for measuring both liquid and gas flows, which embraces each of the general objects therefor earlier stated. In this regard it should be noted that the invention is of quite simple construction and, except for the devices included to measure flow along the auxiliary flowpath, includes no moving parts. Thus, the invention is particularly useful in fluid environments containing solids that cause breakdowns in conventional flowmeter systems.

While various particular embodiments of the present invention have been disclosed herein, it will be understood that various changes, rearrangements, and modifications can be made thereto without departing from the essence and scope of the invention as defined in the appended claims. For example, FIGS. 4 and 5 each include specific details concerning values associated with the component parts of a particular embodiment. Those values are considered to be merely illustrative of that particular embodiment of the invention. Therefore, it is intended that the present disclosure not be interpreted in a limiting sense and that obvious variants of the invention are comprehended to be within its essence and scope.

I claim:

1. Apparatus for measuring fluid flow through a conduit, comprising:
    (a) A fluid flow displacement member mounted in said conduit and having sloped wall means for deflecting the fluid to flow through a region defined by the periphery of said fluid displacement member and the interior surface portion of said conduit proximate said periphery, said slope wall means being effective to substantially linearize the velocity profile of said fluid in at least said region over a predetermined range of fluid flow rates through said conduit;
    (b) conduit means extending transversely through said displacement member for diverting a portion of the fluid passing through said conduit along an auxiliary flowpath having one end positioned upstream of said fluid displacement member and its opposite end positioned downstream of said region; and
    (c) totalizer means in said auxiliary flowpath for determining the total fluid flow therethrough.

2. Apparatus for measuring fluid flow through a conduit comprising:
    (a) a fluid displacement member mounted in said conduit and having sloped wall means for deflecting the fluid to flow through a region defined by the periphery of said fluid displacement member and the interior surface portion of said conduit proximate said periphery, said sloped wall means being effective to substantially linearize the velocity profile of said fluid in at least said region over a predetermined range of fluid flow rates throughs said conduit;

(b) conduit means extending transversely through said displacement member for diverting a portion of the fluid passing through said conduit along an auxiliary flowpath having one end positioned upstream of said fluid displacement member and its opposite end positioned downstream of said regions; and (c) rate-of-flow means in said auxiliary flowpath for determining the rate of fluid flow therethrough.

3. Apparatus for measuring fluid flow through a conduit, comprising a fluid displacement member mounted in said conduit to deflect the fluid to flow through a region defined by the periphery of said fluid displacement member and the interior surface portion of said conduit proximate said periphery, said fluid displacement member being effective to substantially linearize the velocity profile of said fluid in at least said region over a predetermined range of fluid flow rates through said conduit;

(b) conduit means extending transversely through said displacement member for diverting a portion of the fluid passing through said conduit along an auxiliary flowpath having one end positioned upstream of said fluid displacement member and its opposite end positioned downstream of said region;

(c) totalizer means in said auxiliary flowpath for determining the total fluid flow therethrough.

4. Apparatus for measuring fluid flow through a conduit comprising:

(a) a fluid displacement member mounted in said conduit to deflect the fluid to flow through a region defined by the periphery of said fluid displacement member and the interior surface portion of said conduit proximate said periphery, said fluid displacement member being effective to substantially linearize the velocity profile of said fluid in at least said region over a predetermined range of fluid flow rates through said conduit;

(b) conduit means extending transversely through said displacement member for diverting a portion of the fluid passing through said conduit along an auxiliary flowpath having one end positioned upstream of said fluid displacement member and its opposite end positioned downstream of said region;

(c) rate-of-flow means in said auxiliary flowpath for determining the rate of fluid flow therethrough.

5. Apparatus for measuring fluid flow through a conduit comprising:

(a) a fluid flow displacement member mounted in said conduit and having sloped wall means for deflecting the fluid to flow through a region defined by the periphery of said fluid displacement member and the interior surface portion of said conduit proximate said periphery, said sloped wall means being effective to substantially linearize the velocity profile of said fluid in at least said region over a predetermined range of fluid flow rates through said conduit;

(b) conduit means extending transversely through said displacement member for diverting a portion of the fluid passing through said conduit along an auxiliary path having one end positioned upstream of said fluid displacement member and its opposite end positioned downsteam of said region; and (c) transducer means, mounted across said auxiliary path for directly sensing and measuring the pressure differential between the said ends of said auxiliary path.

6. Apparatus for measuring fluid flow through a conduit, comprising:

(a) a fluid displacement member mounted in said conduit to deflect the fluid to flow through a region defined by the periphery of said displacement member and the interior surface portion of said conduit proximate said periphery, said fluid displacement member being effective to substantially linearize the velocity profile of said fluid in at least said region over a predetermined range of fluid flow rates through said conduit; and (b) conduit means extending transversely through said displacement member for diverting a portion of the fluid passing through said conduit along an auxiliary path having one end positioned upstream of said fluid displacement member and its opposite end positioned downstream of said region; and (c) transducer means, mounted across said auxiliary path, for directly sensing and measuring the pressure differential between the said ends of said auxiliary path.

7. Apparatus as set forth in claims 1, 2, 3, 4, 5 or 6 wherein said displacement member is a disc in the form of frustums of two cones joined at their larger ends.

8. Apparatus as set forth in claims 1, 2, 3, 4, 5, 6, or 7 wherein said conduit means passes through the central axis of said fluid displacement member, providing an inlet in the upstream side thereof, and an outlet downstream of said region.

9. Apparatus for measuring fluid flow through a conduit, comprising:

(a) a fluid flow displacement member in the form of frustums of two cones joined at their larger ends for deflecting the fluid to flow through a region defined by the periphery of said fluid displacement member and the interior surface portion of said conduit proximate said periphery, said fluid displacement member being effective to substantially linearize the velocity profile of said fluid in at least said region over a predetermined range of fluid flow rates through said conduit; and (b) conduit means passing through the central axis of said fluid displacement member and having one end in the upstream side thereof, and one end downstream of said region whereby fluid entering said conduit means is adapted to communicate with transducer means for directly sensing and measuring the pressure differential between the said ends.

10. Apparatus as set forth in claim 9 wherein the frustum positioned on the upstream side has a longer central axis than does the frustum positioned on the downstream side.

11. Apparatus for measuring fluid flow through a conduit, comprising:

(a) a fluid flow displacement member mounted in said conduit and having a sloped wall means for deflecting the fluid to flow through a region defined by the periphery of said fluid displacement member and the interior surface portion of said conduit proximate said periphery, said sloped wall means being effective to substantially linearize the velocity profile of said fluid in at least said region over a predetermined range of fluid flow rates through said conduit;

(b) conduit means through the central axis of said fluid displacement member, having one end in the upstream side thereof; and (c) transducer means for directly sensing and measuring pressure differential between said upstream end and a point downstream of said region.

* * * * *